United States Patent [19]

Dischert et al.

[11] Patent Number: 4,571,511
[45] Date of Patent: Feb. 18, 1986

[54] NOISE REDUCTION SYSTEM

[75] Inventors: Robert A. Dischert, Burlington County, N.J.; William H. Meise, Bucks County, Pa.; Clement A. Berard, Jr., Hopewell Township, Mercer County, N.J.

[73] Assignee: RCA Corporation, Princeton, N.J.

[21] Appl. No.: 508,287

[22] Filed: Jun. 27, 1983

[51] Int. Cl.[4] ............................................. H03K 5/08
[52] U.S. Cl. .................................. 307/547; 307/555; 307/561; 328/171; 358/166
[58] Field of Search ............... 307/540, 542, 546, 553, 307/555, 559, 561, 359, 547; 328/162, 163, 165, 171; 358/160, 163, 166

[56] References Cited

U.S. PATENT DOCUMENTS

| | | | |
|---|---|---|---|
| 3,333,055 | 7/1967 | Krause | 178/6 |
| 3,353,106 | 11/1967 | Dudek et al. | 307/542 |
| 3,534,273 | 10/1970 | Thomas | 307/359 |
| 3,602,737 | 8/1971 | Radecke | 307/231 |
| 3,715,477 | 2/1973 | Olson et al. | 178/5.4 |
| 4,009,334 | 2/1977 | Sypula | 358/167 |
| 4,219,745 | 8/1980 | Hersman | 307/358 |
| 4,256,975 | 3/1981 | Fukushima et al. | 307/543 |
| 4,449,102 | 5/1984 | Frazer | 307/359 |
| 4,454,533 | 6/1984 | Lagoni | 358/166 |

OTHER PUBLICATIONS

U.S. patent application Ser. No. 422,667, filed 9/24/82, Dischert, et al. "Adaptive Digital Signal Coring Circuit".

Primary Examiner—John Zazworsky
Attorney, Agent, or Firm—E. M. Whitacre; P. J. Rasmussen; E. P. Herrmann

[57] ABSTRACT

A noise reduction circuit which operates on the principle of coring includes a variable offset potential source in series with one diode which is connected antiparallel with a second diode. The output terminal of the parallel circuit is connected to an integrating capacitor so that the turn-on potential of the diode circuit floats with the output potential. The variable offset potential source is responsive to the output potential to apply varying forward or back bias to one of the diodes and thereby change the coring threshold of the diode dependent upon signal amplitude. The variable offset potential source consists of a resistor connected between two variable current sources configured to provide equal currents of opposite polarity thereto. A digital implementation is also included.

20 Claims, 15 Drawing Figures

NOISE REDUCTION SYSTEM

BACKGROUND OF THE INVENTION

This invention relates to noise reduction apparatus and more particularly to signal coring type circuitry.

Rudimentary coring circuits consist of parallel back-to-back diodes serially connected in a signal processing path. Signals having amplitudes less than the forward biased diode potential $V_{BE}$ are blocked by the diodes and large amplitude signals are passed but with their amplitudes diminished by an amount equal to the diode potential $V_{BE}$. If the assumption is made that noise attendant the signal is of small valued amplitude, the effective signal-to-noise ratio (SNR) of the processed signal can be improved by such a circuit. The magnitude of the window which blocks the low level signals can be increased or decreased by adjusting the respective DC bias potential applied to the diodes, see for example U.S. Pat. No. 4,009,334 entitled "Video Noise Reduction Circuit".

In a television context, the SNR improvement provided by coring reduces "speckles" in the picture. Such noise is ordinarily removed in an analog corer by a frequency-separation filter for dividing the signal into high and low-frequency components. The high frequency components are thereafter passed through a network including diodes, and an output signal is obtained only for those high-frequency signals exceeding a diode threshold voltage. The cored high-frequency components and the unmodified low-frequency components are then additively combined to form a complete signal in which small-amplitude high frequency components are removed (see U.S. Pat. No. 3,333,055).

The magnitude of the high-frequency component of the signal is ordinarily reduced by the offset voltage of the diodes. Thus, the cored signal has an effective high-frequency signal amplitude reduction, which is an unwanted distortion.

The reason for separating the frequency band in the aforementioned corer is to allow the diode offset voltage to effectively "ride" on the low frequency signal component. That is, the diode corer circuit alone, without the frequency-separation filter, would remove signal components about a baseline but would not remove small-amplitude high-frequency noise superimposed on a large-amplitude low-frequency component.

U.S. Pat. No. 4,219,745, entitled "Backlash Filter Apparatus" and issued to Hersman, describes a coring type circuit for analog signal processing in which the coring window or thresholds floats with or tracks the lower frequency signal content. In this circuit, the coring diodes are arranged in the negative feedback path of a differential amplifier. The coring window $V_w$ is determined by the amplifier gain and given by the relation $$V_w = 2V_{BE}/\text{gain}$$

and is typically adjusted to be equal to the peak-to-peak noise voltage.

Returning to the video signal context, coring is implemented to reduce speckles in the reproduced signal. The speckles are the visual manifestation of electrical noise riding on the video signal. However, the intensity of visual speckles as perceived is not directly related to peak noise amplitude. For instance, white going noise components in a generally bright scene and black going noise components in a generally dark scene are much less visible than equal amplitude black going noise components in a bright scene and white going noise components in a dark scene. Considering that coring is a distortion of the video signal which can obscure or eliminate fine signal detail, it is desirable to perform the least possible amount of coring while still substantially eliminating the speckles. In conformance with this constraint, and because of the non-symmetric visual manifestation to noise in the video signal, the corer should have a variable window which tracks the signal and should have an asymmetric transfer function. That is, for a video signal representative of a dark scene, the corer should reduce the amplitude or eliminate white going noise components to a greater extent than black going noise components; and similarly for a video signal representative of a brighter scene, the corer should reduce black going noise components to a greater degree than white going noise components. This implies that the coring window be variable and a function of the instantaneous signal magnitude.

SUMMARY OF THE INVENTION

The present invention is a coring type noise reduction circuit having a coring window which tracks the applied signal and which has a variable coring width responsive to the magnitude of the applied signal. In addition the coring window is not symmetrically disposed about the applied signal for applied signals near the extremes of the signal range.

One embodiment of the apparatus consists of the parallel connection of two resistor-diode circuits in which the diodes are poled in opposite directions. Current sources responsive to the cored signal provide currents that are directed through the resistor creating signal sensitive offset potentials in series with the diodes to establish the coring window. The output end of the resistor-diode circuit is connected to an integrating capacitor which tends to cause the coring window to follow the cored signal.

A digital embodiment for coring binary signals selects varying threshold parameters from memory responsive to the cored signal amplitudes.

BRIEF DESCRIPTION OF THE DRAWINGS

FIGS. 2b, 3b and 4b are graphical illustrations of the coring range developed by the respective circuits of FIGS. 2a, 3a and 4a;

DETAILED DESCRIPTION

Figure 1A:
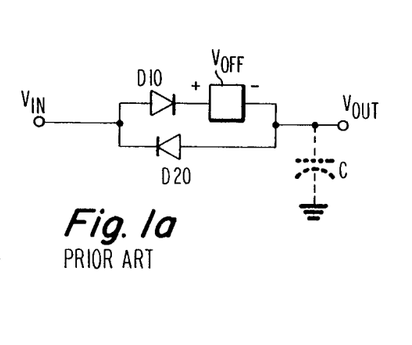
FIGS. 1a, 1b, 1c and 1d are schematic diagrams of a rudimentary coring circuit and graphical illustrations of its transfer functions.
Figures 1B, 1D:
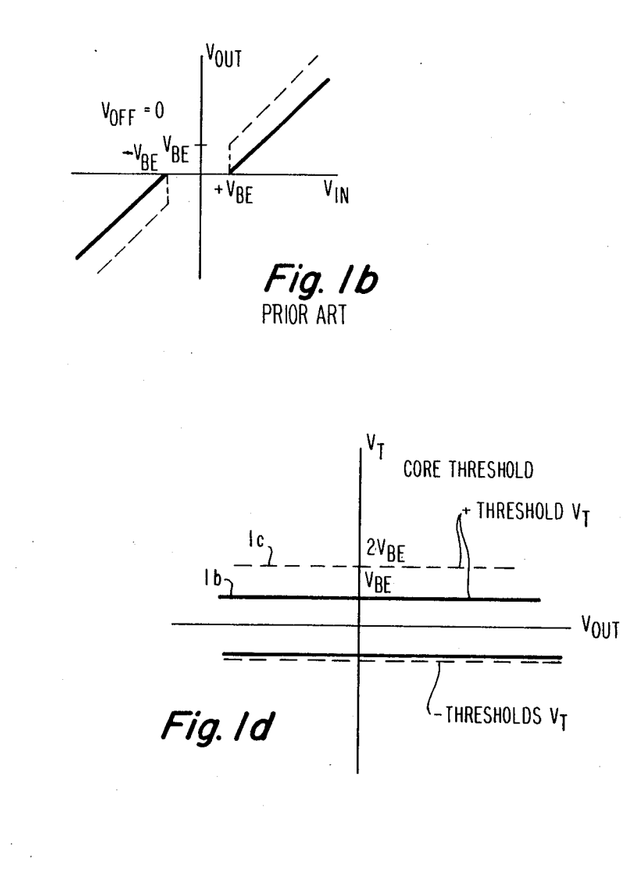

FIG. 1a is a coring circuit including the combination of diode D20 connected anti-parallel with the serial connection of diode D10 and an offset DC voltage source $V_{off}$ e.g. a battery. Consider the offset voltage to be zero and the forward diode potential to be $V_{be}$. Under these conditions, only signals with amplitudes one $|V_{be}|$ greater than the output potential will pass from terminal $V_{in}$ to $V_{out}$. This transfer function is illustrated by the solid line in FIG. 1b wherein it is assumed that the dc output potential is maintained at zero. The dashed line in FIG. 1b illustrates a more ideal coring circuit transfer function where signals that have sufficient magnitude to pass through the circuit are not reduced by the value of the diode potential.

Figure 1C:
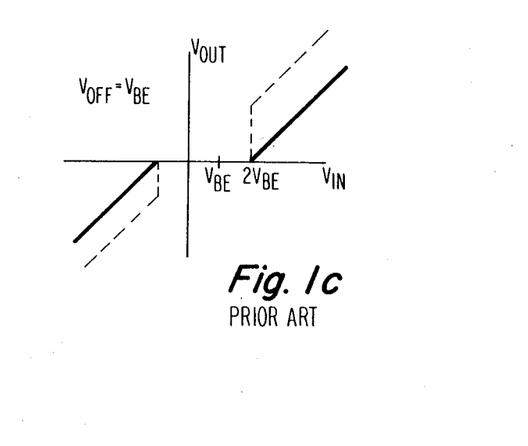

Consider next the FIG. 1a circuit with an offset potential source $V_{off}$ equal to one $V_{be}$ and poled to oppose forward conduction of diode D10. Before diode D10 can conduct under these conditions the input voltage must exceed the forward potential drop ($V_{be}$) of diode D10 plus the offset source potential ($V_{be}$) i.e., the positive input potential $V_{in}$ must be greater than 2 $V_{be}$ before positive potentials will be realized at the circuit output. Diode D20 is not influenced by the offset potential source. The coring transfer function for the circuit of FIG. 1a with $V_{off}$ equal to $V_{be}$ is illustrated by the solid line in FIG. 1c. As in FIG. 1b the dashed line in FIG. 1c illustrates a more ideal coring transfer function.

Consider next the FIG. 1a coring circuit with a capacitor, C, (shown in phantom lines) connected between the output terminal $V_{out}$ and ground potential. When diode D10 conducts, capacitor C charges positively to the value $$V_c = V_{in} - (V_{D10} + V_{off}) \quad (1)$$

and if the magnitude of $V_{in}$ continues to increase the capacitor continues to charge. Assume that the input potential then decreases slightly. Diode D10 will become back biased by the amount of the decrease and Diode D20 will be back biased by an amount equal to $V_{be}$ minus the decrease. In effect the addition of the capacitor has caused the baseline of the coring window to track or float with the input signal.

FIG. 1d illustrates the coring thresholds or window for the FIG. 1a circuit including the capacitor C. In this configuration, the transfer functions of FIGS. 1b and 1c tend to track the output potential. Since the diode potentials and the offset potential $V_{OFF}$ have a fixed value, the threshold values remain constant with output potential. The horizontal lines designated 1b and 1c in FIG. 1d demonstrate the constant threshold values exhibited by the FIG. 1a circuit including capacitor C and arranged with (line 1c) and without (line 1b) an offset bias.

Figure 2A:
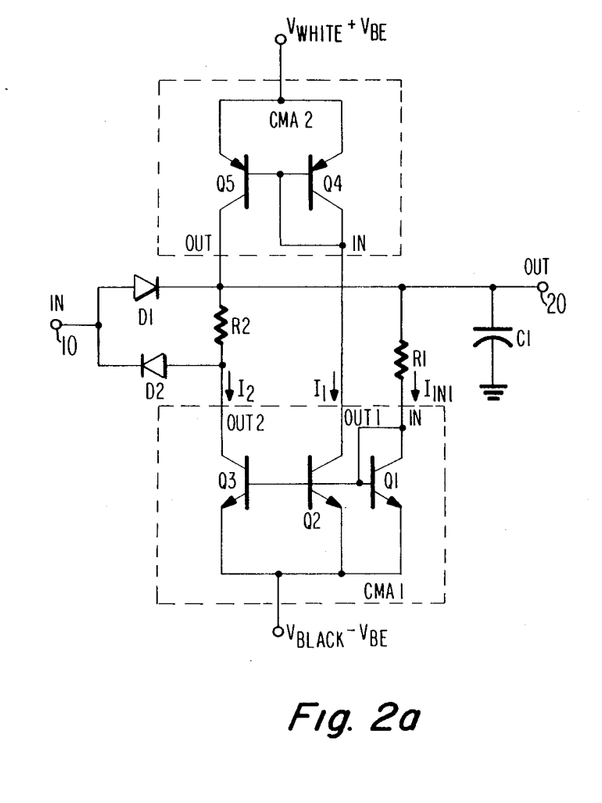
FIGS. 2a, 3a, an 4a are schematic diagrams of noise reduction circuits embodying the present invention.

FIG. 2a illustrates a tracking type of coring circuit including antiparallel coring diodes D1 and D2 and capacitor C1. A resistor, R2, for generating a variable offset potential is connected in series with diode D2. Current from high impedance current sources CMA1 and CMA2 are directed through resistor R2 to develop the offset potential, which current sources are responsive to the coring circuit output signal making the offset potential vary in accordance with signal level. Two current sources are employed, one (CMA2) for directing current into one end of the resistor, and one (CMA1) for extracting like current from the other end of the resistor so that the applied currents do not affect operation of the circuit except for generating an offset potential in series with diode D2.

Current source CMA1 is a current amplifier of the current mirror type having an input terminal connected through resistor R1 to output terminal 20, and having a first output terminal (out 1) connected to the input terminal of current source CMA2, and a second output terminal connected to the interconnection of diode D2 and resistor R2. CMA1 consists of three transistors Q1, Q2 and Q3 having common emitter connections and common base connections and being fabricated with like construction. The common base connection is coupled to the collector electrode of transistor Q1 which in turn is connected to the CMA1 input terminal. The amplitude of the collector currents in transistors Q2 and Q3 is related to the CMA1 input current by the ratio of the area of the base-emitter junction of the respective transistor to the base-emitter junction area of transistor Q1, which ratios can be accurately controlled in integrated circuit devices. The common emitter connection is applied to a source of potential ($V_{black} - V_{be}$) which is at least one $V_{be}$ potential more negative than the most negative excursion of the input signal. Since the input terminal of the CMA1 is coupled to the base of transistor Q1, the potential at the CMA1 input terminal is clamped at one $V_{be}$ above the applied emitter potential supply. The CMA1 input current is thus determined by the potential across R1 divided by the resistance of R1 i.e., the input current $I_{in1}$ equals the output potential $V_c$ minus ($V_{black} - V_{be} + V_{be}$) divided by R1 or $$I_{in1} = (V_c - V_{black})/R_1 \quad (2)$$

The output current $I_2$ at the second output (Out2) of CMA1 is A2 times $I_{in1}$ where A2 is the ratio of the base-emitter junction areas of Q3 to Q1. The output current $I_1$ at the first output (Out1) of CMA1 is A1 times $I_{in1}$ where A1 is the ratio of the base-emitter junction areas of Q2 to Q1.

Output current $I_1$ is applied to source CMA2 which is shown as a current mirror having an input and single output. The input current $I_1$ to CMA2 is reflected or mirrored by transistor Q5 at the output of CMA2 and applied to resistor R2. The emitters of the CMA2 transistors Q4 and Q5 are applied to supply potential ($V_{white} + V_{be}$) which is at least one $V_{be}$ potential greater than the maximum potential swing of the input signal. The system of CMA1—CMA2 therefore has a compliance voltage of ($V_{white} - V_{black}$) which extends over the entire range of the expected input signals.

The gains of the CMA's must be arranged so that the net current contributed by the CMA's to the coring circuit per se is zero. This requires that the output current of CMA2 be equal to the output current $I_2$ of CMA1 plus the input current of CMA1 or $$I_{OUT\ CMA2} = (1 + A_2)I_{in\ CMA1}. \quad (3)$$

In addition the resistance value R2 must be small enough not to undesirably limit the frequency response of the applied signal. On the other hand the resistance value of resistor R1 will normally be large to prevent loading of the circuit by the normally low input impedance of CMA1.

Figure 2B:
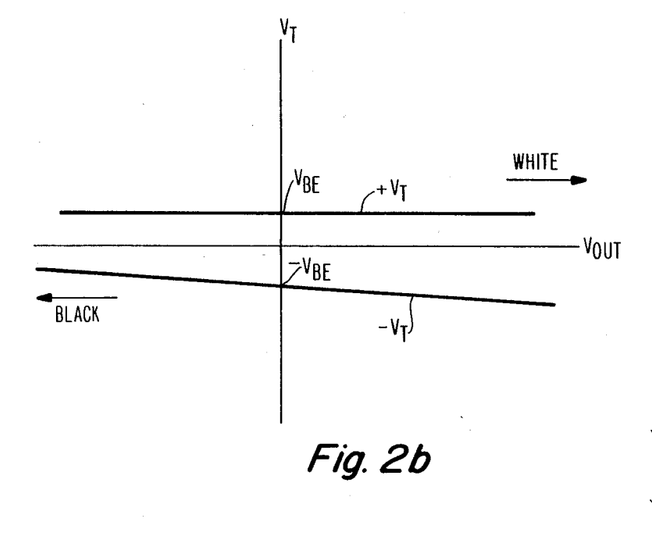

The coring thresholds of the FIG. 2a circuit are illustrated in FIG. 2b. The positive coring threshold remains positive at one $V_{be}$ above the output potential since diode D1 is not biased by any offset potential. In operation this means that only positive signal values which are one $V_{be}$ greater than the instantaneous potential on the capacitor will be passed by diode D1.

The negative coring threshold represented by the line below the abscissa is seen to increase (in absolute value) with increasing signal amplitude $V_{OUT}$. Note that when the capacitor C1 potential is at the $V_{black}$ potential the potential across resistor R1 is zero. No input current is applied to CMA1 and therefore no offset bias current is directed through resistor R2. At this potential the negative coring threshold is established by the forward offset of Diode D2 and is equal to $|V_{be}|$. As the capacitor potential increases, increasing current is applied to R2 generating a voltage $V_{R2}$ which back biases D2 adding to the negative coring threshold i.e., the negative threshold becomes $|V_{be}+V_{R2}|$ for all output potential values greater than $V_{black}$. More precisely the negative threshold equals $|V_{be}+A2R2(V_c-V_{black})/R_1|$.

When applied to the video signal context white going signals are cored with a threshold value of $V_{be}$. Black going signals are cored with a threshold value tending toward one $V_{be}$ when the signal is generally representative of a dark image, and cored with a significantly larger threshold when the input signal is representative of a generally white image. Thus negative going signal excursions of greater amplitude are cored in lighter images than in darker images.

Figure 3A:
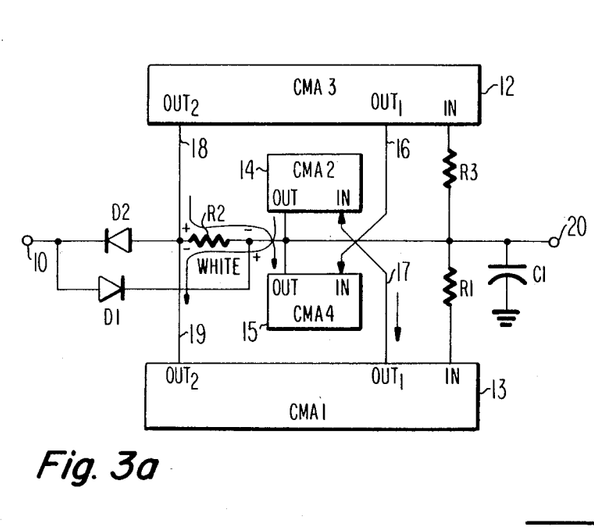

The circuit of FIG. 3a incorporates a second set of signal responsive current sources CMA3 and CMA4 so that current can be directed through the offset resistor R2 in both directions. CMA3 and CMA4 operate in similar fashion to CMA1 and CMA2 of FIG. 2a respectively with the exception that they generate currents of opposite polarity thereto. The input of CMA3 is coupled in common with the input of CMA1. The second outputs OUT2 of CMA1 and CMA3 are coupled in common at one end of resistor R2 and the outputs of CMA2 and CMA4 are coupled in common at the other end of resistor R2.

CMA1 and CMA2 generate larger amplitude currents for more positive output potentials at terminal 20 and CMA3 and CMA4 generate larger amplitude currents for more negative potentials. Assuming $|V_{white}|$ equals $|V_{black}|$, then with zero potential on terminal 20, CMA1 will generate a current equal in amplitude to that generated by CMA3 and CMA2 and CMA4 will generate equal amplitude currents. Under this condition terminal OUT2 of CMA1 will sink all of the current sourced by terminal OUT2 of CMA3, and CMA4 will sink the current sourced by CMA2. Thus no offset bias current will flow through R2. The negative coring threshold set by the diode D2 signal path will be established by the diode potential $|V_{be}|$ of D2.

Output potentials greater than zero will condition CMA1 and CMA2 to provide larger currents than CMA3 and CMA4 and a net current will flow from right-to-left in resistor R2. This will impose a back bias on diode D2 increasing the negative coring threshold above $|V_{be}|$. Conversely output potentials less than zero volts will condition CMA3 and CMA4 to provide larger currents than CMA1 and CMA2 and net current will flow from left-to-right in resistor R2. This current will tend toward forward biasing diode D2 and diminsh the negative coring threshold. Since no offset potential is included on the diode D1 circuit it provides a positive coring threshold of $V_{be}$ throughout the range of output potentials.

Figure 3B:
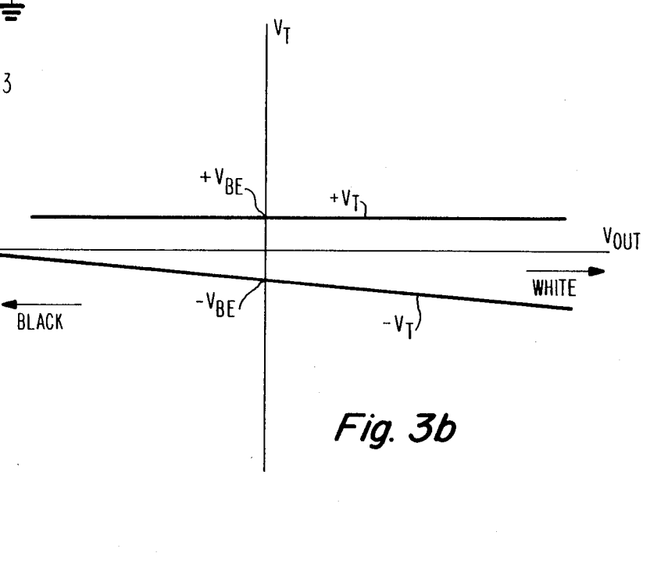

FIG. 3b illustrates the coring window or range of the FIG. 3a circuit. The coring function shown is predicated on both sets of CMA's having linear gain and providing equal currents at zero potential. The negative coring threshold is $|2V_{be}|$ for the most positive signal potential and zero for the most negative signal potential.

Figures 4A, 4B:
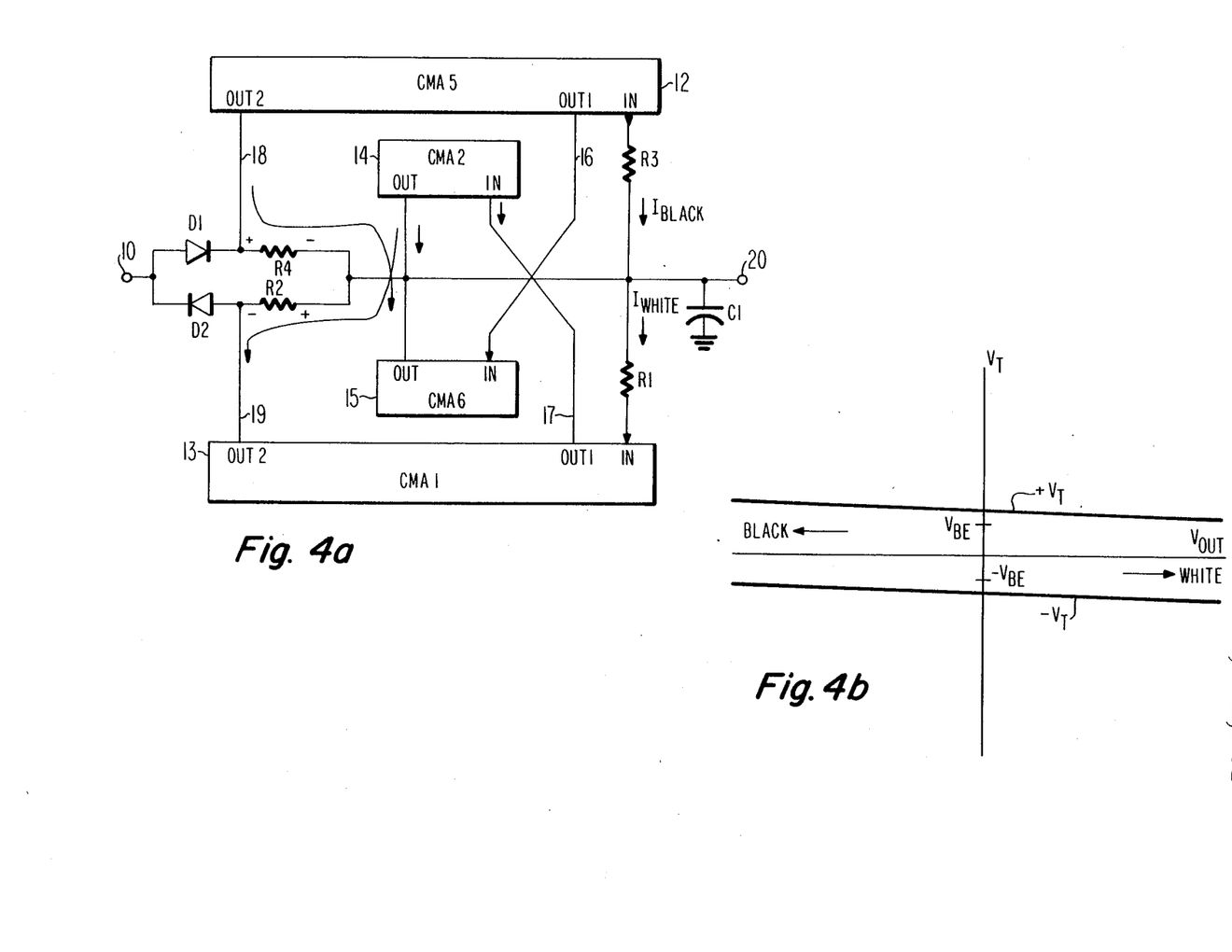

FIG. 4a is a further variation of the FIG. 2a circuit where an offset resistor R4 is included in series with diode D1 similar to the resistor R2 in series with D2. Variable current sources CMA5 and CMA6 respectively similar to CMA1 and CMA2 with the exception of providing currents of opposite polarity thereto, are arranged to direct current through resistor R4. Since diode D2, resistor R2 and sources CMA1 and CMA2 are arranged in similar manner as in FIG. 2a the negative coring threshold of the circuit will be similar to that of FIG. 2a.

CMA5 and CMA6 are connected to direct current through resistor R4 to apply a back bias offset to diode D1. However, the magnitude of the currents provided by CMA5 and CMA6 is generally inversely related to the magnitude of the currents of CMA1 and CMA2. The magnitude of the positive coring threshold produced by diode D1 and resistor R4 is therefore generally inversely related to the negative coring threshold produced by diode D2 and resistor R2. Thus the positive coring threshold is greatest for negative output potentials and the negative coring threshold is greatest for positive output potentials as indicated in FIG. 4b.

As a further alternative consider interchanging the CMA5 OUT2 connection with the CMA1 OUT2 connection. With this arrangement the currents will be directed through resistors R2 and R4 to generate offset potentials tending to forward bias diodes D1 and D2. The positive and negative coring thresholds will be shifted toward each other with the maximum coring positive or negative threshold magnitude being one $V_{be}$, the positive threshold tending toward zero at positive output potentials and the negative threshold tending toward zero at negative output potentials.

When the FIG. 4a circuit is employed to core video signals, white going signal excursions are cored more deeply than black going signal excursions for signals representing dark images and black going signal excursions are cored more deeply than white going signal excursion for signals representing whitish images. It will readily be appreciated that such a circuit efficiently imposes the maximum coring process where it is most effective and minimizes the amount of coring where it is least needed.

Figures 5, 6:
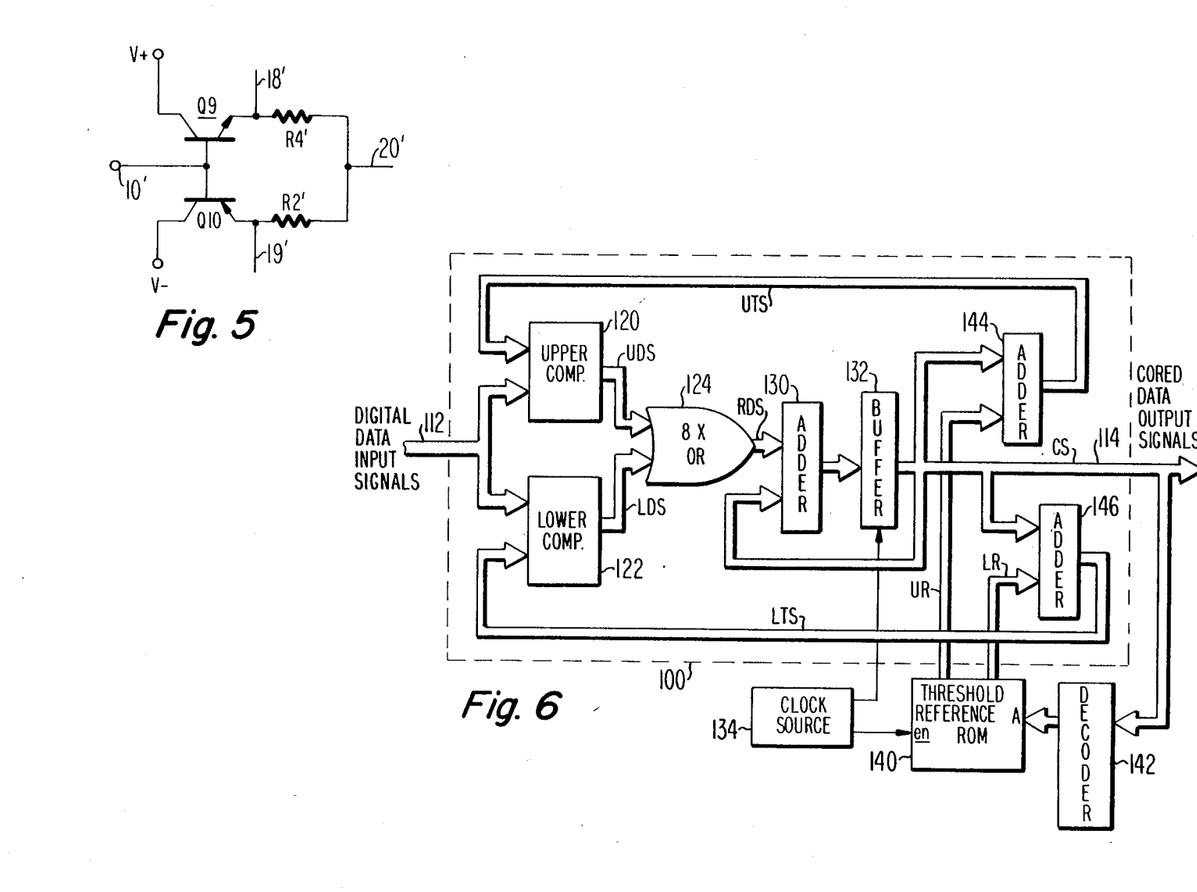
FIG. 5 is a schematic diagram of alternate junction devices for use in coring.
FIG. 6 is schematic diagram of a digital coring circuit embodying the present invention.

FIG. 5 is a schematic diagram of a portion of the FIG. 4a circuit wherein transistors Q9 and Q10 are substituted for diodes D1 and D2 respectively. In FIG. 5 the base-emitter junctions of the transistors perform the rectifying function of the diodes with the advantage of buffering the input source and providing current gain. The magnitude of the potential offset of the base-emitter junctions of Q9 and Q10 is similar to the forward potential offset of the diodes D1 and D2. However, since transistor Q9 and Q10 are opposite conductivity devices, their base-emitter offset potentials will differ somewhat, which may be used to advantage for nonsymmetrical positive and negative coring.

Note also that the current amplifiers described have linear transfer functions with respect to signal potential. It may be more advantageous to use non-linear amplification, e.g. logarithmic, in the video context so that coring is insignificant except at the extremeties of the signal range. The only requirement imposed on the current amplifier transfer function is that the net current applied between terminals 10 and 20 be zero.

FIG. 6 illustrates circuitry for the digital implementation of a tracking, adaptive noise reduction circuit or corer which operates on a digital signal such as a pulse code modulated data stream found in a digital TV receiver.

Digital data input signals comprising a stream of parallel-bit digital words are applied to adaptive digital signal coring apparatus 100 at input 112. Corer 100 supplies cored data output signals CS comprising a similar stream of parallel-bit digital words at its output 114.

In FIG. 6, broad arrows indicate paths for parallel-bit digital signals, for example, eight-bit digital words representing values of digital signals in a television receiver including digital signal processing as for luminance and chrominance information. Arrows using single lines indicate paths carrying either a single digital bit, a serial digital word or a continuous signal, for example, control signals or clocking signals.

Eight-bit upper digital comparator 120 receives at its inputs the digital signals from input 112 and an upper threshold digital signal UTS. Threshold signal UTS determines the upper boundary of a range of digital values to be cored. Upper comparator 120 develops an eight-bit upper digital difference signal UDS which has a value representative of the difference between the input digital signal and the threshold signal UTS when the input digital signal exceeds UTS, that is, when the input digital signal value is without the coring values. Otherwise, difference signal UDS has zero value.

Eight-bit lower digital comparator 122 receives at its inputs the digital signals from input 112 and a lower threshold digital signal LTS which determines the lower boundary of the range of values to be cored. Lower comparator 122 develops an eight-bit lower digital difference signal LDS which has a value representative of the difference between the input digital signal and the threshold signal LTS when the input digital signal exceeds LTS in the sense opposite to that employed by comparator 120. That is, when the input digital signal value is without the coring range of values in the negative direction. Otherwise, difference signal LDS has zero value.

Difference signals UDS and LDS are combined by the eight-bit OR circuit 124 to develop an eight-bit digital signal RDS, the value of which represents the degree to which the input digital signal departs from the range of values to be removed by coring and the sense or polarity associated with such departure. Thus, representative signal RDS will have zero value when the input digital signal value is within the range of values having boundaries determined by threshold signals UTS and LTS. In addition, RDS will be, for example, a positive-valued difference when the input signal value is greater than threshold UTS and will be a negative-valued difference when the input signal value is below the threshold value LTS.

An ADDER circuit 130 and an eight-bit buffer or latch circuit 132 form a clocked accumulator which produces the running sum of the RDS signal values. The sums are successively stored in the buffer 132, the output of which is coupled to one input port of ADDER 130. The most current RDS signal value from OR circuit 124 is applied to a second input port of ADDER 130, wherein it is summed with the previous sum supplied from buffer 132. The new or current sum produced by ADDER 130 is then clocked into buffer 130 in response to clock signals developed in clock source 134 (the clock signals being synchronous with the sample rate of the digital input signals to terminal 112). Thus, for each digital word of the input signal, the contents of buffer 132 are updated to reflect the result of the comparisons performed by digital comparators 120 and 122.

The cored digital output signals CS are developed directly by applying the stored contents of buffer 132 to the output 114 of corer 110. The stored contents of buffer 132 are further employed to develop threshold signals UTS and LTS referred to above.

Threshold reference signal source 140, which may be a read only memory (ROM) programmed with a plurality of reference values, develops upper and lower reference signals UR and LR in response to address signals supplied by DECODER circuit 142. DECODER 142 has an input port connected for receiving the cored output signals and generates address signals for ROM 140 which correspond to different ranges of the cored signal. For example, for the range of output values corresponding to signal values corresponding to ±10 millivolts, one address is generated. For signals between 10 and 20 millivolts another address is generated. For signals between 20 and 40 millivolts another address may be generated and so forth. Alternatively if it is desirable to provide minimal coring for midrange signals with increased coring only for larger values of signal, the decoder 142 may be made to respond only to the more significant bits of the cored signal. In this mode, the coring threshold would be maintained constant for all cored signal values represented by the signal bit positions of lower order than the more significant bits selected to control the coring level. Coring threshold reference values would change only for changes of the selected more significant bits of the cored signal. On the other hand, if it is desired to have a continuously variable threshold responsive to the cored output signal, the DECODER 142 may be eliminated and the ROM 140 addressed directly with the cored output signal. In this instance the ROM will contain a set of threshold values for every possible output signal value. Preferably the ROM will be enabled by a clocking signal to ensure that the references applied to ADDERS 144 and 146 are synchronzied with the data from BUFFER 132.

Reference source 140 may comprise two parallel ROM's which store the digital words supplied as reference signals UR and LR, respectively. UR and LR can each be up to eight bits in length but are usually of lesser length in an eight-bit digital television signal processing system. Reference signals UR and LR establish the upper and lower boundaries of a coring range with respect to a baseline or zero signal value.

Upper reference signal UR is combined with the digital value stored in buffer 132 by eight-bit adder 144 to produce the upper threshold signal UTS. Lower reference signal LR is combined with the digital value stored in buffer 132 by eight-bit adder 146 to produce the lower threshold signal LTS. Where the baseline signal value is zero, LR is a negative digital value.

Because UR and LR are added to the contents of buffer 132 which reflects the cored signal magnitude, threshold signals UTS and LTS reflect the magnitude of the coring range established by UR and LR but with respect to a baseline value modified by the cored signal magnitude. As a result, the coring operation performed by digital comparators 120 and 122, OR circuit 124, ADDER 130, and buffer 132 removes variations of the digital input signal which are of lesser magnitude than the coring range over the entire range of values of the digital input signal.

The comparators 120 and 122 may be realized using binary subtraction circuits and logical AND circuits. For example the upper comparator 120 would include a subtraction circuit with the UTS and data input signals respectively connected as the minuend and subtrahend. The difference signal from the subtraction circuit is applied to the AND circuit where it is ANDED with the sign bit. When the sign bit indicates a negative difference i.e., when the input signal exceeds the UTS, and AND circuit is arranged to pass the difference signal. On the other hand when the sign bit indicates a positive difference the AND circuit is arranged to output a binary zero. The lower comparator 122 may be constructed in a similar manner.

Figure 7A:
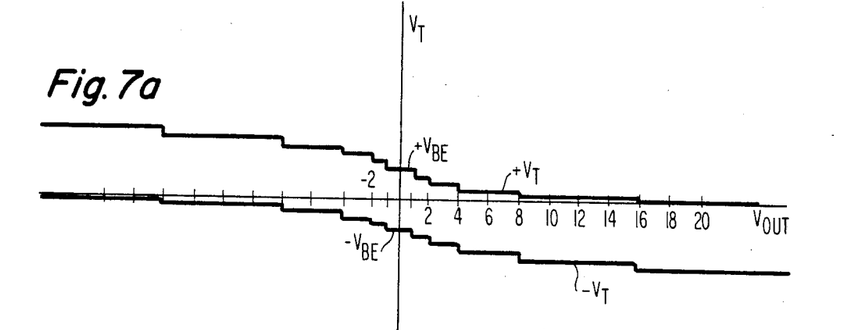
FIGS. 7a, 7b and 7c are graphical representations of the coring thresholds or window of the FIG. 6 circuit.
Figure 7B:
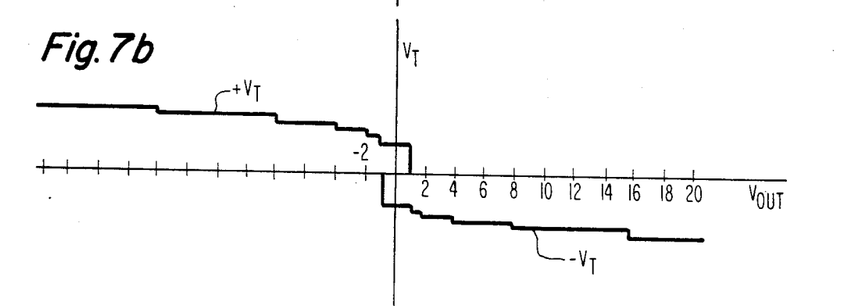
Figure 7C:
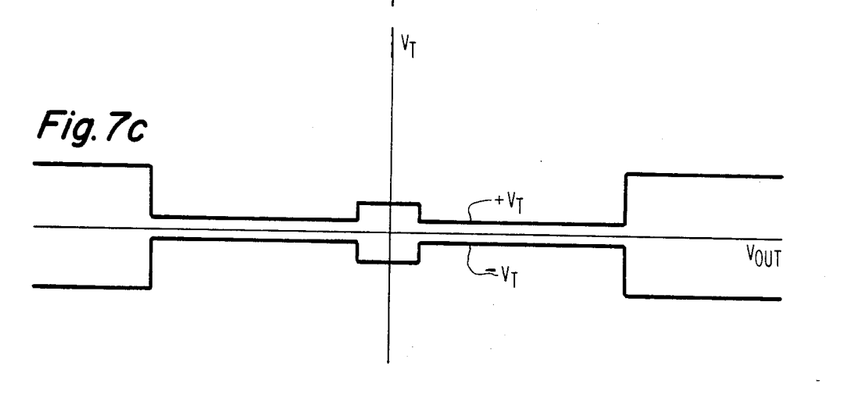

FIGS. 7a–7c show graphically several possible coring windows which may be implemented depending on the DECODER function and the ROM program. FIG. 7a illustrates a coring window wherein the references are changed each time the signal values double i.e., each time a more significant bit position of the signal changes from a zero to a one logic level. For eight bit binary signals this requires 15 positive and 15 negative reference values or a ROM 140 having 30 stored words. Since positive and negative reference values are accessed from memory simultaneously, only 15 addresses need to be generated by the decoder. In this instance the decoder may be realized with an eight bit-to-four bit priority decoder. If for an eight bit signal the maximum coring threshold desired is ten percent of the signal level i.e., 13 for ±127 possible quantizations the ROM required will contain 4 bits times 30 words or 120 storage bits.

FIG. 7b is an alternate coring function particularly suitable for video signal processing wherein the coring threshold for white going signals goes to zero for signals above midrange (i.e., greater than zero) and where the coring threshold for black going signals goes to zero for signals below midrange (i.e., less than zero). Note to generate this function approximately one-half the amount of memory space is required relative to the FIG. 7a coring function since both the positive and negative threshold values are zero over half the signal range. In FIG. 7b, the threshold values are seen to change for each doubling of the output signal so the DECODER may again be realized with a priority decoder.

FIG. 7c illustrates a further coring function where coring is maintained at a minimum except where it is most desirable to perform coring which for video signal occurs where the signal is relatively small (near zero), for positive-going excursions (white-going) when the signal represents dark images and for negative going excursions (black going) when the signal corresponds to lighter images. In this instance, the decoder may be realized with combinatorial logic arranged to recognize specific bit patterns in the output signal. It will be readily appreciated that very little memory is required to produce the FIG. 7c coring function.

For the situation where the decoder is eliminated and the output signal is used to address the ROM directly the coring function can be made to resemble any of the functions illustrated in FIGS. 1b, 1c, 2b, 3b, 4b, 7a–c as well as many others. The only limitation on the coring function is the size of the ROM required.

What is claimed is:

1. Apparatus for reducing electrical noise in a signal, comprising:
   threshold means having an input terminal for applying said signal and having an output terminal at which portions of signal excursions of said signal in excess of positive and negative threshold values is available;
   means coupled to said output terminal for storing said signal portions to develop a noise reduced signal and for causing said positive and negative thresholds to track said passed signal; and
   means responsive to said noise reduced signal for varying the values of at least one of said thresholds relative to the signal passed.

2. The apparatus set forth in claim 1 wherein said threshold means includes:
   first and second diodes;
   respective means for connecting said first and second diodes between said input and output terminals, said diodes being poled to conduct in opposite directions relative to said input terminal.

3. The apparatus set forth in claim 2 wherein the means for varying the value of at least one of said thresholds includes a variable potential source included in one of said respective means for coupling one the first and second diodes between the input and output terminals, the amplitude of said variable potential source being responsive to the amplitude of potentials occurring at said output terminal.

4. The apparatus set forth in claim 1 wherein said threshold means includes;
   first and second comparator circuits each having signal and reference input terminals and respective output terminals;
   means for coupling the output terminals of said first and second comparators to a common output terminal;
   means for applying said signal to the signal input terminals of said first and second comparators; and
   means for applying first and second threshold signal values to the reference input terminals of the first and second comparators respectively.

5. The apparatus set forth in claim 4 wherein the means for varying the values of at least one of said thresholds includes;
   a ROM having an address input port, said ROM being programmed with a plurality of threshold values;
   means for coupling said address input port to said means for storing said signal portions, for providing addressing signals to said ROM, the threshold values addressed in said ROM thereby being determined by said noise reduced signal.

6. Noise reduction apparatus comprising:
   input and output terminals;
   a capacitor connected between said output terminal and a point of fixed potential;
   first and second rectifying elements;
   means having first and second terminals for generating a variable potential therebetween responsive to siganl applied to a third terminal;
   means for serially coupling said means for generating a variable potential and said first rectifying element between said input and output terminals;
   means for coupling said third terminal to said output terminal; and
   means for serially coupling the second rectifying element between said input and output terminals; said second rectifying element being poled for conduction opposite to said first rectifying element.

7. The apparatus set forth in claim 6 wherein the first and second rectifying elements are first and second diodes.

8. The apparatus set forth in claim 8 wherein the means for generating a variable potential comprises:
   a resistor connected between said first and second terminals;
   a first current source responsive to signal applied to said third terminal for generating variable amplitude current of a first polarity, said variable amplitude current being applied to said furst terminal;
   a second current source for generating a variable amplitude current proportional to the current generated by said first current source but of opposite polarity thereto, said current generated by said second current source being applied to said second terminal.

9. The apparatus set forth in claim 8 wherein said first current source comprises a current amplifier having an input terminal coupled to said third terminal by a further resistor and having first and second current output terminals, said second current output terminal being connected to said first terminal, and said second current source comprises a second current amplifier having an input terminal connected to the first current output terminal of said first current amplifier and having a current output terminal connected to said second terminal.

10. The apparatus set forth in claim 9 wherein said first and second current amplifiers are current mirror amplifiers.

11. The apparatus set forth in claim 6 wherein the means for serially coupling the second rectifying element between said input and output terminals comprises a second means for generating a variable potential responsive to signal at said output terminal.

12. The apparatus set forth in claim 11 wherein said means for generating a variable potential and said second means for generating a variable potential, generate potentials of opposite polarity relative to said input and output terminals.

13. The apparatus set forth in claim 6 wherein the means for generating a variable potential is poled to tend to reverse bias said first rectifying element.

14. The apparatus set forth in claim 6 wherein the means for generating a variable potential is poled to tend to forward bias said first rectifying element.

15. The apparatus set forth in claim 8 further including:
   a third current source responsive to signal applied to said third terminal for generating variable amplitude current of said second polarity and increasing-/decreasing in magnitude for the current generated by said first current source decreasing/increasing in magnitude, and wherein said variable amplitude current from said third current source is applied to said first terminal;
   a fourth current source for generating a variable amplitude current proportional to the current generated by said third current source but of opposite polarity thereto which current being applied to said second terminal, and wherein said variable potential changes polarity for a range of signals at said third terminal.

16. An adaptive tracking coring circuit comprising:
   an input and an output terminal;
   first and second resistors having respective first ends connected to said output terminal;
   a capacitor connected between said output terminal and a point of fixed potential;
   a first current mirror circuit having current input and first and second current output terminals, said current input terminal being connected to a second end of said first resistor and said second current output terminal being connected to a second end of said second resistor;
   a second current mirror circuit having a current input terminal coupled to said first current output terminal and having a current output terminal connected to said output terminal, and wherein the polarity of output current is opposite the polarity of output current from said first current mirror;
   a first diode connected between the second end of said second resistor and said input terminal; and
   a second diode connected between said input and output terminals and poled for conduction between said input and output terminals opposite to said first diode.

17. Apparatus for reducing noise in digital signals comprising:
   comparison means to which said digital signals and first and second threshold signals are applied for producing further digital signals representing the values and senses by which said digital signals depart from a range of values between said first and second threshold signal values;
   means for storing digital signals;
   means for summing said further digital signals with signal stored in said storing means;
   means for applying said summed signals to said storing means;
   means responsive to said stored signals for generating sets of first and second reference signals; and
   means for combining said stored digital signals and said first and second reference signals to generate sets of said first and second threshold signals.

18. The apparatus set forth in claim 17 wherein said comparison means comprises:
   first comparator means for providing a positive difference digital signal when the value of said input digital signal is above that of said first threshold signal;
   second comparator means for providing a negative difference digital signal when the value of said input signal is below that of said second threshold signal; and
   further combining means to which said positive difference and negative difference signals are coupled for providing said further digital signal.

19. The apparatus set forth in claim 17 wherein the means for generating sets of first and second reference signals comprises:
   a ROM having an address input port and an output port and programmed with a plurality of sets of reference values;
   means for coupling said address input port to the means for storing digital signals; and
   means for connecting the ROM output port to said means for combining said stored and reference signals.

20. The apparatus set forth in claim 19 wherein the means for coupling the ROM address port to said means for storing digital signals includes a decoder.

* * * * *

UNITED STATES PATENT AND TRADEMARK OFFICE
CERTIFICATE OF CORRECTION

PATENT NO. : 4,571,511

DATED : Feb. 18, 1986

INVENTOR(S) : Robert A. Dischert et al.

It is certified that error appears in the above-identified patent and that said Letters Patent is hereby corrected as shown below:

Column 10, line 56    "siganl" should read --signal--.

Column 11, line 1     that portion reading "claim 8" should read -- claim 6 --;

line 8     "furst" should read -- first --.

Signed and Sealed this

Twenty-eighth Day of October, 1986

[SEAL]

*Attest:*

DONALD J. QUIGG

*Attesting Officer*      *Commissioner of Patents and Trademarks*